United States Patent
Mohindra

(10) Patent No.: US 8,970,544 B1
(45) Date of Patent: Mar. 3, 2015

(54) DIGITAL FILTERING AND SPREAD SPECTRUM BASED INTERFERENCE MITIGATION FOR MUTUAL AND SELF CAPACITANCE PANEL

(75) Inventor: Rishi Mohindra, Milpitas, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 152 days.

(21) Appl. No.: 13/480,414

(22) Filed: May 24, 2012

(51) Int. Cl.
*G06F 3/045* (2006.01)
*G06F 3/041* (2006.01)

(52) U.S. Cl.
USPC .......................................... 345/174; 345/173

(58) Field of Classification Search
None
See application file for complete search history.

(56) References Cited

U.S. PATENT DOCUMENTS

| | | | | |
|---|---|---|---|---|
| 5,053,757 | A * | 10/1991 | Meadows | 345/173 |
| 5,565,658 | A * | 10/1996 | Gerpheide et al. | 178/18.02 |
| 5,905,489 | A * | 5/1999 | Takahama et al. | 345/174 |
| 7,084,860 | B1 * | 8/2006 | Jaeger et al. | 345/173 |
| 7,868,874 | B2 * | 1/2011 | Reynolds | 345/173 |
| 2008/0029316 | A1 * | 2/2008 | Jaeger et al. | 178/19.01 |
| 2008/0158172 | A1 * | 7/2008 | Hotelling et al. | 345/173 |
| 2009/0009483 | A1 | 1/2009 | Hotelling | |
| 2010/0060589 | A1 | 3/2010 | Wilson | |
| 2010/0060593 | A1 | 3/2010 | Krah | |
| 2011/0063154 | A1 * | 3/2011 | Hotelling et al. | 341/143 |
| 2012/0013546 | A1 * | 1/2012 | Westhues et al. | 345/173 |
| 2012/0013564 | A1 * | 1/2012 | Westhues et al. | 345/174 |
| 2012/0056841 | A1 * | 3/2012 | Krenik et al. | 345/174 |
| 2012/0268142 | A1 * | 10/2012 | Kremin et al. | 324/658 |

OTHER PUBLICATIONS

U.S. Appl. No. 13/480,357, filed May 24, 2012 entitled "Hadamard Matrix Based Projected Mutual Capacitance Touch Panel Decoding".
U.S. Appl. No. 13/480,395, filed May 24, 2012 entitled "Mutual Capacitance Large Panel Phase Shift Mitigation".

\* cited by examiner

*Primary Examiner* — Jason Olson
*Assistant Examiner* — Stephen T Reed
(74) *Attorney, Agent, or Firm* — Advent, LLP

(57) ABSTRACT

A touch screen controller for a capacitive touch screen panel having row conductors intersecting column conductors to form pixels, the touch screen controller comprising: a transmitting unit configured to drive the row conductors with signals formed from an excitation matrix, and a receiving unit configured to sense signals from the column conductors and to determine the capacitance of the pixels using the sensed signals. In some embodiments, the receiving unit is configured to apply zero-ISI filtering to the sensed signals prior to the capacitance of the pixels being determined. In some embodiments, the transmitting unit is configured to spread each bit of the row drive signals with a pseudo-noise code, and the receiving unit is configured to de-spread the sensed signals with the pseudo-noise code. In some embodiments, the transmitting unit is configured to pulse shape the row drive signals.

52 Claims, 6 Drawing Sheets

DIGITAL FILTERING AND SPREAD SPECTRUM BASED INTERFERENCE MITIGATION FOR MUTUAL AND SELF CAPACITANCE PANEL

FIELD OF THE INVENTION

The present invention relates to the field of touch screens. More specifically, the present invention relates to interference mitigation for touch screens.

BACKGROUND OF THE INVENTION

Many modern electronic devices incorporate a touch screen to display information and as an input that is activated by touching the display. One technology for implementing the touch aspect of a touch screen is capacitance sensing. An insulator, such as glass, is coated with a transparent conductor, such as indium tin oxide (ITO). Since the human body is an electrical conductor, when a finger actuates the touch screen, such as by touching or even getting very close to its surface, the electrostatic field of the touch screen is distorted, resulting in a measurable change in capacitance.

A mutual capacitance touch screen comprises two layers of material arranged in an X-Y grid such that an actuation of the touch screen can be resolved into a coordinate. A finger is typically larger than the spacing of X-Y grid lines in the layers of a mutual capacitance touch screen. Thus, multiple grid lines can be activated at different signal levels during a single actuation of the touch screen. A capacitive touch screen controller is able to resolve the signals on the X-Y multiple grid lines into an X-Y coordinate. Multiple signals are injected in parallel onto the row ITO traces and sensed in parallel at the column ITO traces. Mutual capacitance between rows and columns is affected by the proximity of fingers and conductive bodies. A touch screen controller decodes the coordinates of a touch upon the screen by repetitively scanning the touch screen sense lines in response to stimulation of the drive lines in accordance with an excitation matrix, E. The excitation matrix E has order M×N where M is the number of drive lines (rows) and N is the number of sense lines (columns) in the touch screen.

In one example, a touch screen has 20 drive lines (M) and 15 sense lines (N). A vector of output voltages Y is measured at each sense line. The order of vector Y is M, the number of columns. To decode the coordinates of a touch based upon capacitance at an intersection of a drive line and a sense line, it is necessary to determine the capacitance of each column vector X, given the vector of measured voltages Y. X is also a vector of order M. The excitation matrix, E, the vector of capacitances for a sense line, X, and the vector of voltages measured at a sense line, Y, are related by the equation E*X=Y, which is represented dimensionally as:

$$\begin{bmatrix} E_{1,1} & \cdots & E_{1,N} \\ \vdots & \ddots & \vdots \\ E_{M,1} & \cdots & E_{M,N} \end{bmatrix} \cdot \begin{bmatrix} X_1 \\ \vdots \\ X_M \end{bmatrix} = \begin{bmatrix} Y_1 \\ \vdots \\ Y_M \end{bmatrix}$$

In order to find the vector of capacitances X, we must find the inverse of the matrix, E, indicated by $E^{-1}$, and multiply it by the vector of measured voltages Y, as shown in the equation $X=E^{-1}*Y$. However, not every matrix can be inverted. Additionally, the condition number of the excitation matrix is important, since a high condition number will result in the amplification of errors and a less perfect estimation of the capacitance values. Generally, the excitation matrices in the prior art do not have condition numbers lower than two. As the condition number of the excitation matrix increases, the signal-to-noise ratio (S/N) deteriorates.

FIG. 1 illustrates a prior art touch screen system 100, which involves exciting the rows of a mutual capacitance touch panel matrix F, 120, with an R×R excitation matrix E, 110. Panel matrix F has R rows and C columns, wherein R>=C. Each column of panel F is dot-multiplied with one selected column of excitation matrix E, which is carried out by row amplifiers 115 driving the row ITOs of the panel F. The process is repeated sequentially every chip time interval k for each column of excitation matrix E. The successive chip time intervals are labeled by k=1 to R. The row elements of the excitation matrix E, which are either 1 or −1, are multiplied with a sine-wave carrier signal 125. There are an integer number of sine wave cycles per chip time interval. The carrier signal is used to frequency translate the signal to a high frequency (e.g., ~50-500 kHz) in order to have low correlation with low frequency interference from an underlying LCD panel and battery chargers. The panel 120 comprises a crossbar two-layer configuration of ITO rows and columns. Proximity of a finger changes the mutual capacitance between rows and columns in the vicinity of the finger. The detection of the change in this mutual capacitance is usually in the 1-5% range of the mutual capacitance at the cross-point. The mutual capacitance change relative to the total capacitance is much smaller. The column ITOs are each sensed with a charge-coupled LNA 130, whose output is mixed with the original carrier sine wave and then integrated-and-dumped at the integrate-and-dump block 135 for each period of the excitation row-signal output. The integrated-and-dumped output is then collected into a matrix L, 140, with R rows and C columns. Each column output of the panel is the sum of the row signals affecting the particular column. The $c^{th}$ column signal at the $k^{th}$ chip interval that is stored in matrix L at L(k,c) is given by Equation 1 below. Multiplication of excitation matrix E by a carrier sine wave is also shown by the term S(t). The range of c is 1 to R, and if C<R, then the panel F is taken as zero for F(r,c) where c>C.

$L_{carrier}(k,c,t)=S(t)*[F(1,c)*E(1,k)+F(2,c)*E(2,k)+F(3,c)*E(3,k)+\ldots+F(R,c)*E(R,k)]$ for $T_k<=t<=T_{k+1}$ $S(t)=\sin(2\pi f_T t)$, where is the carrier frequency. Also, $T_{chip}$ is integer multiple of $1/f_T$. Down conversion and integrate-and-dump is given by:

$$L(k,c) = \int_{t=T_k}^{t=T_{k+1}} L_{carrier}(k, c, t) * S(t)\, dt$$

$L(k,c)=F(1,c)*E(1,k)+F(2,c)*E(2,k)+F(3,c)*E(3,k)+\ldots+F(R,c)*E(R,k)$. [Eq. 1]

$L(k,c)=\Sigma F(r,c)*E(r,k)$, summed over r=1 to R.
$L(k,c)=\Sigma E'(k,r)*F(r,c)$, summed over r=1 to R, where $E'(k,r)$=transpose of $E(r,k)$.

Using general matrix multiplication notation Y=A*B, where element $Y(i,j)=[A(i,n)*B(n,j)]$ summed over n, $L=E'*F$, [Eq. 2]

where L=L(k,c) is the received column matrix,
E' is the transpose of E=E(r,k) that is the transmitted excitation matrix, and
F=F(r,c) is the panel mutual capacitance matrix.

The final column signal L is actually obtained by demodulating with the carrier sine wave followed by an integrate-and-dump operation. To obtain the panel mutual capacitance matrix F, from Equation 2, $$F=\text{inv}(E')*L. \quad [\text{Eq. 3}]$$

Values of E are chosen for the lowest constant column-sum while keeping E invertible, with a low condition number and with a low RMS and Peak Error for F per Equation 2, using fixed-point simulation including fixed-point elements of inv (E). Usually the columns of excitation matrix E are cyclically shifted versions of the $1^{st}$ column If the panel is fully uniform, i.e., all elements in F(r,c) are equal to a constant β, and the variation in F(r,c) is only 1-5% with touch, then Equation 1 is approximately the column-sum of E for the $c^{th}$ column, multiplied by constant β*T where T is the integration period. Even though E is chosen for the smallest column-sum, the dynamic range of the A/Ds 137, which are positioned after the integrate-and-dump blocks 135, can be improved by having the column-sum equal to zero. This is done by subtracting a constant 'd*β*T' from the column signal:

$$L2=L-d*\beta*T=E'*F-d*\beta*T, \text{ where } d=\text{sum (any column of } E).\quad [\text{Eq. 4}]$$

From above, $$F=\text{inv}(E')*L2-d*\beta*T*\text{inv}(E'), \text{ and}$$

$$F=\text{inv}(E')*L2-D, \text{ where } D=d*\beta*T*\text{inv}(E') \text{ is a constant } R\times C \text{ matrix.}$$

The value of D is not computed directly since it cancels out in the baseline correction for computing the finger image profile Fp (given below for the $f^{th}$ frame):

$$Fp=F-B, \text{ where } B=\text{mean } (F \text{ without finger}) \text{ taken over many frames.}\quad [\text{Eq. 5}]$$

Fp=(inv(E')*L2−D)−mean[inv(E')*L2(without finger)−D].
Fp=inv(E')*L2−mean[inv(E')*L2(without finger)].
As seen in Equation 5, the finger profile is extracted without actually computing the value of D.

Referring back to FIG. 1, the matrix L is pre-multiplied by the inverse of E, 150, to produce the panel mutual capacitance matrix F, 160. The value of F is averaged when there is no finger in the proximity in order to compute the baseline B. When elements (i.e., pixels) in F are detected with significant deviation from their corresponding baseline values, the presence of a finger is assumed. In this case, the baseline B is subtracted from the current matrix F to produce the finger image profile Fp=F−B. The matrix Fp is further processed (both spatially and temporally) to track fingers and possibly reduce interference (e.g., by temporal pixel filtering over frames of Fp).

Capacitive touch screen controllers are prone to interference from LCD noise and battery charger noise that show up as false touches. Existing handheld touch screen products, such as cell phones and tablet computers, are severely affected by this interference. Even with touch screen systems that do not operate at base band frequency and that use a carrier in the 50-500 kHz range, harmonics of the above mentioned interference sources get into the signal pass band, especially when they are close to the carrier.

The only filtering the prior art uses to deal with the interference is an integrate-and-dump operation. Interference rejection is solely determined by the integrate-and-dump operation, which has a Sinc low-pass frequency response. It is similar to a first order low-pass filter (i.e., sin(x)/x) in the stop band region, which is not sufficient to reject out-of-band signals. Since a carrier is used, the sinc low-pass response is frequency translated to the carrier, where it now has a band pass response. The simulated response is shown in FIGS. 3A-B, which illustrate simulated interference rejection in relation to frequency for different interference mitigation schemes. The simple first order response has only 20 dB/decade out-of-band rejection. The in-band rejection is negligible. The rejection is defined as the relative change in "pixel" analog signal level in dB when compared to an ideal case without interference and without any filtering and PN spreading. The rejection yard stick for a digital communication system would be different, and would involve BER estimation under noise and interference.

SUMMARY OF THE INVENTION

The present invention can be employed in various types of touch screen systems, including, but not limited to, self capacitance touch screen systems and mutual capacitance touch screen systems. The present invention uses spread spectrum techniques and zero-ISI digital filtering to mitigate touch panel interference. These methods have not been applied to capacitive touch screen systems where the analog signals are stationary and the touch information has a very small impact on the signals. While digital communication systems can tolerate a large ISI as long as the BER is acceptable, touch screen systems can only tolerate extremely small ISI on the panel analog signal, and therefore they require very special treatment for digital filtering. In some embodiments, the present invention also uses Hadamard matrices for panel encoding and decoding, along with spread spectrum techniques and zero-ISI digital filtering to mitigate touch panel interference. In some embodiments, the present invention uses a modified Hadamard matrix that is the dot product of a Hadamard matrix with a cover code matrix. In some embodiments, the present invention moves the A/D to the LNA output or to the down converter output in order to save analog die area and perform the operations digitally, resulting in a much smaller die area.

In one aspect of the present invention, a touch screen controller for a capacitive touch screen panel has a plurality of row conductors intersecting with a plurality of column conductors to form a matrix of pixels, with each pixel configured to have a capacitance. The touch screen controller comprises: a transmitting unit configured to drive the row conductors with row drive signals formed from an excitation matrix; and a receiving unit configured to sense signals from the column conductors and to determine the capacitance of the pixels using the sensed signals, wherein the receiving unit is configured to apply zero-ISI filtering to the sensed signals prior to the capacitance of the pixels being determined.

In some embodiments, the receiving unit is configured to apply the zero-ISI filtering digitally to the sensed signals. In some embodiments, the zero-ISI filtering is low pass filtering. In some embodiments, the zero-ISI filtering is Raised Cosine filtering. In some embodiments, the zero-ISI filtering is Bessel filtering. In some embodiments, the transmitting unit is configured to pulse shape the row drive signals. In some embodiments, the transmitting unit is configured to pulse shape the row drive signals with a sine wave. In some embodiments, the transmitting unit is configured to spread each bit of the row drive signals with a pseudo-noise code, and the receiving unit is configured to de-spread the sensed signals with the pseudo-noise code. In some embodiments, the pseudo-noise code is a Barker code. In some embodiments, the Barker code is a 31-bit Barker code. In some embodiments, the transmitting unit is further configured to spread the row drive signals with a long pseudo-noise code, wherein the long pseudo-noise code covers multiple bits, and the receiving unit is further configured to de-spread the sensed signals with the pseudo-noise code. In some embodiments, the receiving unit is configured to apply a window function to the de-spreading pseudo-noise code. In some embodiments, the excitation matrix is a Hadamard matrix. In some embodiments, the excitation matrix is a modified Hadamard matrix that is the dot product of a Hadamard matrix with a cover code matrix. In some embodiments, the capacitive touch screen panel is a mutual capacitance touch screen panel. In some embodiments, the capacitive touch screen panel is a self capacitance touch screen panel.

In another aspect of the present invention, a method of mitigating interference in a capacitive touch screen panel is provided. The touch screen panel has a plurality of row conductors intersecting with a plurality of column conductors to form a matrix of pixels, with each pixel configured to have a mutual capacitance, and the method comprises: driving the row conductors with row drive signals formed from an excitation matrix; sensing signals from the column conductors; applying a zero-ISI filter to the sensed signals; and determining the capacitance of the pixels using the filtered sensed signals.

In some embodiments, the zero-ISI filter is applied digitally. In some embodiments, the zero-ISI filter is a low pass filter. In some embodiments, the zero-ISI filter is a Raised Cosine filter. In some embodiments, the zero-ISI filter is a Bessel filter. In some embodiments, the method further comprises pulse-shaping the row drive signals. In some embodiments, pulse-shaping the row drive signals comprises pulse-shaping the row drive signals with a sine wave. In some embodiments, the method further comprises: spreading each bit of the row drive signals with a pseudo-noise code; and de-spreading the sensed signals with the pseudo-noise code. In some embodiments, the pseudo-noise code is a Barker code. In some embodiments, the Barker code is a 31-bit Barker code. In some embodiments, the method further comprises: spreading the row drive signals with a long pseudo-noise code, wherein the long pseudo-noise code covers multiple bits; and de-spreading the sensed signals with the pseudo-noise code. In some embodiments, the method further comprises applying a window function to the de-spreading pseudo-noise code. In some embodiments, the excitation matrix is a Hadamard matrix. In some embodiments, the excitation matrix is a modified Hadamard matrix that is the dot product of a Hadamard matrix with a cover code matrix. In some embodiments, the capacitive touch screen panel is a mutual capacitance touch screen panel. In some embodiments, the capacitive touch screen panel is a self capacitance touch screen panel.

In yet another aspect of the present invention, a. touch screen controller for a capacitive touch screen panel has a plurality of row conductors intersecting with a plurality of column conductors to form a matrix of pixels, with each pixel configured to have a capacitance. The touch screen controller comprises: a transmitting unit configured to drive the row conductors with row drive signals formed from an excitation matrix, wherein the transmitting unit is configured to spread each bit of the row drive signals with a pseudo-noise code; and a receiving unit configured to sense signals from the column conductors and to determine the capacitance of the pixels using the sensed signals, wherein the receiving unit is configured to de-spread the sensed signals with the pseudo-noise code prior to the capacitance of the pixels being determined In some embodiments, the pseudo-noise code is a Barker code. In some embodiments, the Barker code is a 31-bit Barker code. In some embodiments, the transmitting unit is further configured to spread the row drive signals with a long pseudo-noise code, wherein the long pseudo-noise code covers multiple bits, and the receiving unit is further configured to de-spread the sensed signals with the long pseudo-noise code. In some embodiments, the receiving unit is configured to apply a window function to the de-spreading pseudo-noise code. In some embodiments, the transmitting unit is configured to pulse shape the row drive signals. In some embodiments, the transmitting unit is configured to pulse shape the row drive signals with a sine wave. In some embodiments, the receiving unit is configured to apply zero-ISI filtering to the sensed signals prior to the capacitance of the pixels being determined. In some embodiments, the receiving unit is configured to apply the zero-ISI filtering digitally to the sensed signals. In some embodiments, the zero-ISI filtering is low pass filtering. In some embodiments, the zero-ISI filtering is Raised Cosine filtering. In some embodiments, the zero-ISI filtering is Bessel filtering. In some embodiments, the excitation matrix is a Hadamard matrix. In some embodiments, the excitation matrix is a modified Hadamard matrix that is the dot product of a Hadamard matrix with a cover code matrix. In some embodiments, the capacitive touch screen panel is a mutual capacitance touch screen panel. In some embodiments, the capacitive touch screen panel is a self capacitance touch screen panel.

In yet another aspect of the present invention, a method of mitigating interference in a capacitive touch screen panel is provided. The touch screen panel has a plurality of row conductors intersecting with a plurality of column conductors to form a matrix of pixels, with each pixel configured to have a mutual capacitance, and the method comprises: driving the row conductors with row drive signals formed from an excitation matrix, wherein each bit of the row drive signals is spread with a pseudo-noise code; sensing signals from the column conductors; de-spreading the sensed signals with the pseudo-noise code; and determining the capacitance of the pixels using the de-spread sensed signals.

In some embodiments, the pseudo-noise code is a Barker code. In some embodiments, the Barker code is a 31-bit Barker code. In some embodiments, the method further comprises: spreading the row drive signals with a long pseudo-noise code, wherein the long pseudo-noise code covers multiple bits; and de-spreading the sensed signals with the long pseudo-noise code. In some embodiments, the method further comprises applying a window function to the de-spreading pseudo-noise code. In some embodiments, the method further comprises pulse-shaping the row drive signals. In some embodiments, the method further comprises pulse-shaping the row drive signals with a sine wave. In some embodiments, the method further comprises applying a zero-ISI filter to the sensed signals prior to the capacitance of the pixels being determined. In some embodiments, the zero-ISI filter is applied digitally. In some embodiments, the zero-ISI filter is a low pass filter. In some embodiments, the zero-ISI filter is a Raised Cosine filter. In some embodiments, the zero-ISI filter is a Bessel filter. In some embodiments, the excitation matrix is a Hadamard matrix. In some embodiments, the excitation matrix is a modified Hadamard matrix that is the dot product of a Hadamard matrix with a cover code matrix. In some embodiments, the capacitive touch screen panel is a mutual capacitance touch screen panel. In some embodiments, the capacitive touch screen panel is a self capacitance touch screen panel.

In yet another aspect of the present invention, a touch screen controller for a capacitive touch screen panel has a plurality of row conductors intersecting with a plurality of column conductors to form a matrix of pixels, with each pixel configured to have a capacitance. The touch screen controller comprises: a transmitting unit configured to drive the row conductors with row drive signals formed from an excitation matrix, wherein the transmitting unit is configured to pulse shape the row drive signals; and a receiving unit configured to sense signals from the column conductors and to determine the capacitance of the pixels using the sensed signals.

In some embodiments, the transmitting unit is configured to pulse shape the row drive signals with a sine wave. In some embodiments, the receiving unit is configured to apply zero-ISI filtering to the sensed signals prior to the capacitance of the pixels being determined. In some embodiments, receiving unit is configured to apply the zero-ISI filtering digitally to the sensed signals. In some embodiments, the zero-ISI filtering is low pass filtering. In some embodiments, the zero-ISI filtering is Raised Cosine filtering. In some embodiments, the zero-ISI filtering is Bessel filtering. In some embodiments, the transmitting unit is configured to spread each bit of the row drive signals with a pseudo-noise code, and the receiving unit is configured to de-spread the sensed signals with the pseudo-noise code. In some embodiments, the pseudo-noise code is a Barker code. In some embodiments, the Barker code is a 31-bit Barker code. In some embodiments, the transmitting unit is further configured to spread the row drive signals with a long pseudo-noise code, wherein the long pseudo-noise code covers multiple bits, and the receiving unit is further configured to de-spread the sensed signals with the pseudo-noise code. In some embodiments, the receiving unit is configured to apply a window function to the de-spreading pseudo-noise code. In some embodiments, the excitation matrix is a Hadamard matrix. In some embodiments, the excitation matrix is a modified Hadamard matrix that is the dot product of a Hadamard matrix with a cover code matrix. In some embodiments, the capacitive touch screen panel is a mutual capacitance touch screen panel. In some embodiments, the capacitive touch screen panel is a self capacitance touch screen panel.

In yet another aspect of the present invention, a method of mitigating interference in a capacitive touch screen panel is provided. The touch screen panel has a plurality of row conductors intersecting with a plurality of column conductors to form a matrix of pixels, with each pixel configured to have a mutual capacitance, and the method comprises: driving the row conductors with row drive signals formed from an excitation matrix, wherein the row drive signals are pulse-shaped; sensing signals from the column conductors; and determining the capacitance of the pixels using the sensed signals.

In some embodiments, the row drive signals are pulse-shaped with a sine wave. In some embodiments, the method further comprises applying a zero-ISI filter to the sensed signals prior to the capacitance of the pixels being determined. In some embodiments, the zero-ISI filter is applied digitally. In some embodiments, the zero-ISI filter is a low pass filter. In some embodiments, the zero-ISI filter is a Raised Cosine filter. In some embodiments, the zero-ISI filter is a Bessel filter. In some embodiments, the method further comprises: spreading each bit of the row drive signals with a pseudo-noise code; and de-spreading the sensed signals with the pseudo-noise code. In some embodiments, the pseudo-noise code is a Barker code. In some embodiments, the Barker code is a 31-bit Barker code. In some embodiments, the method further comprises: spreading the row drive signals with a long pseudo-noise code, wherein the long pseudo-noise code covers multiple bits; and de-spreading the sensed signals with the pseudo-noise code. In some embodiments, the method further comprises applying a window function to the de-spreading pseudo-noise code. In some embodiments, the excitation matrix is a Hadamard matrix. In some embodiments, the excitation matrix is a modified Hadamard matrix that is the dot product of a Hadamard matrix with a cover code matrix. In some embodiments, the capacitive touch screen panel is a mutual capacitance touch screen panel. In some embodiments, the capacitive touch screen panel is a self capacitance touch screen panel.

In some embodiments, the present invention comprises a program storage device readable by a machine, tangibly embodying a program of instructions executable by the machine to perform one or more of the methods of the present invention.

DETAILED DESCRIPTION OF THE INVENTION

Figure 1:
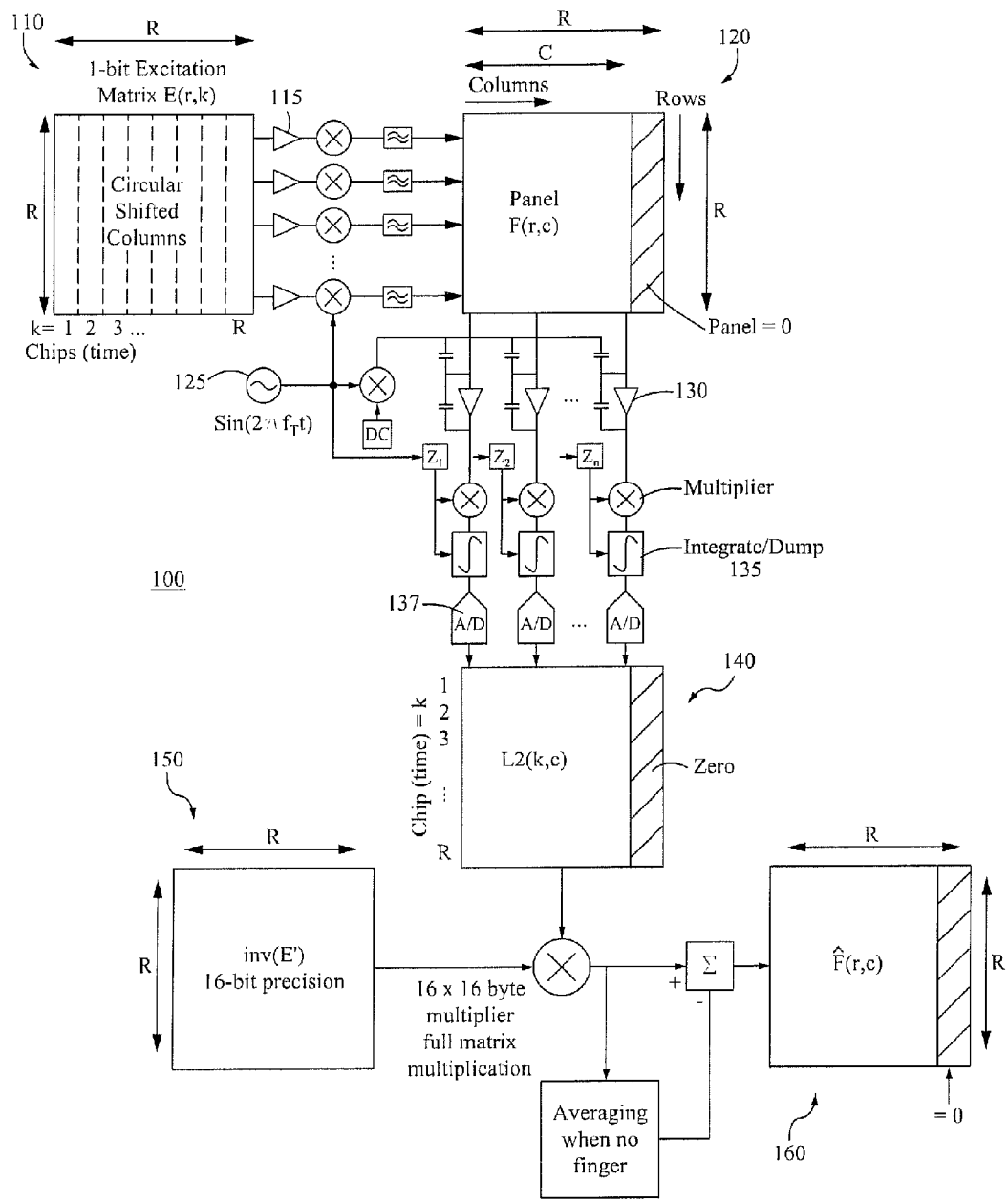
FIG. 1 illustrates a prior art touch screen system.

The following description is presented to enable one of ordinary skill in the art to make and use the invention and is provided in the context of a patent application and its requirements. Various modifications to the described embodiments will be readily apparent to those skilled in the art and the generic principles herein can be applied to other embodiments. Thus, the present invention is not intended to be limited to the embodiment shown but is to be accorded the widest scope consistent with the principles and features described herein.

The present invention can be provided as a computer program product that can include a machine-readable medium having stored thereon instructions that can be used to program a computer (or other electronic devices) to perform a process according to the present invention. The machine-readable medium can include, but is not limited to, floppy diskettes, optical disks, CD-ROMs, ROMs, RAMs, magnet or optical cards, or other type of media/machine-readable medium suitable for storing electronic instructions.

Furthermore, it is contemplated that any features from any embodiment can be combined with any features from any other embodiment. In this fashion, hybrid configurations of the illustrated embodiments are well within the scope of the present invention.

Various aspects of the disclosure can be described through the use of flowcharts. Often, a single instance of an aspect of the present disclosure can be shown. As is appreciated by those of ordinary skill in the art, however, the protocols, processes, and procedures described herein can be repeated continuously or as often as necessary to satisfy the needs described herein. Additionally, it is contemplated that method steps can be performed in a different order than the order illustrated in the figures, unless otherwise disclosed explicitly or implicitly.

The present invention provides several features. In some embodiments, each time bit of the transmit row excitation signal is spread with a pseudo-noise (PN) code, such as a 31-chip Barker sequence. De-spreading is performed using the same code at the column receiver, preferably prior to any integrate-and-dump operation. In some embodiments, spreading is dynamically turned on and off. In some embodiments, the PN spreading and de-spreading is dynamically turned on and off based on interference signal frequency, which can be detected using standard techniques. In some embodiments, it is turned on when interference is close-in to the carrier. Additionally, the PN code length can be extended beyond a bit interval (i.e., even over multiple frame intervals) using long PN codes for reduced correlation with interference signals. Furthermore, in some embodiments, the integrate-and-dump operation in the column receiver is replaced with a narrow-band low pass filter that preferably has zero ISI at appropriate sampling instances. Alternatively, in some embodiments, a wider-band low pass filter is implemented before the integrate-and-dump operation. Additionally, in some embodiments, time-windowing and/or pulse-shaping can be applied to the transmit bits, or the transmit chips when PN spreading has been implemented, in order to reduce the out-of-band spectrum that mixes corresponding out-of-band interference back into pass-band due to non-linearity of the correlator. In some embodiments, time-windowing and/or pulse shaping is applied to the de-spreading PN sequence in order to reduce out-of-band to in-band conversion gain of interference signals. It is contemplated that any and all of these features can be implemented digitally by implementing digitization before or immediately after the correlator. However, it is also contemplated that any and all of these features can be implemented in analog.

As mentioned above, in some embodiments, the present invention uses a PN sequence to modulate the phase of the carrier in the transmitter, in contrast with the prior art, which uses a constant carrier phase. In some embodiments, the PN sequence is a Barker sequence. For example, assume that the prior art uses 32 carrier cycles per chip interval for a certain panel configuration. In some embodiments, the present invention uses 31 carrier cycles per chip and modulates the carrier phase with a 31-bit Barker sequence PN code (e.g. −1 −1 −1 1 1 −1 1 1 1 −1 1 −1 1 1 −1 −1 −1 −1 1 −1 −1 1 1 −1 1 1 1 −1 1 1 sequence), thereby implementing BPSK spreading. Each chip of the prior art would be spread with this 31-subchip Barker code. If one carrier cycle is used per subchip, then the subchip rate would be equal to the carrier frequency. The chip rate would be 1/31 of the subchip rate. The 31-bit Barker sequence has good spreading and correlation properties. QPSK spreading of the carrier can also be used by shifting the carrier sine wave by 0, 90, 180, and 270 degrees for each subchip-period of the excitation. The processing gain for a 31-bit Barker sequence is 15 dB. In some embodiments, the signal decoding would involve an integrate-and-dump operation over each chip interval after despreading with the Barker code. While the present invention's use of a 31-bit Barker sequence has been found to be particularly beneficial, it is contemplated that other types of codes and spreading lengths (e.g., 15-bit) can be used for the PN sequence and are within the scope of the present invention.

Barker codes and other short PN sequences of the present invention are repetitive for every bit. In some embodiments, the present invention multiplies this type of PN sequence with a very long PN code that covers multiple chips or even multiple frames. This long PN code is a sequence that is repetitive after a long stretch of bits (i.e., cycles). In some embodiments, the PN code itself is multiplied with a base Barker sequence whose length is much smaller, but is repeated cyclically indefinitely. A longer PN code will have better spreading of interference when finger touch decoded information is averaged over multiple frames. The use of both the short PN sequence, such as a Barker code, and a long PN sequence together makes the PN sequence truly randomized.

Figure 3A:
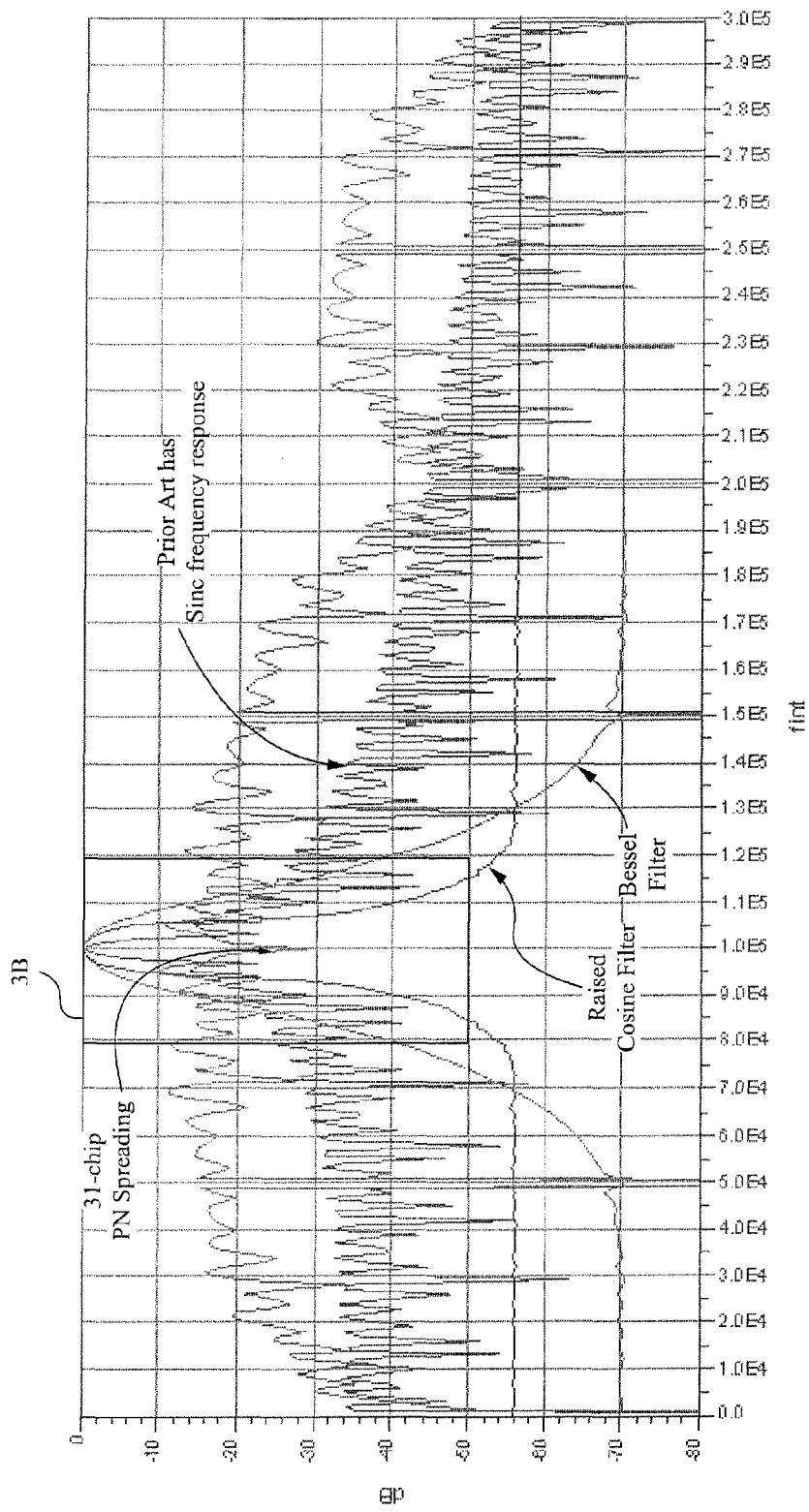
FIG. 3A is a graph illustrating simulated interference rejection in relation to frequency.
Figure 3B:
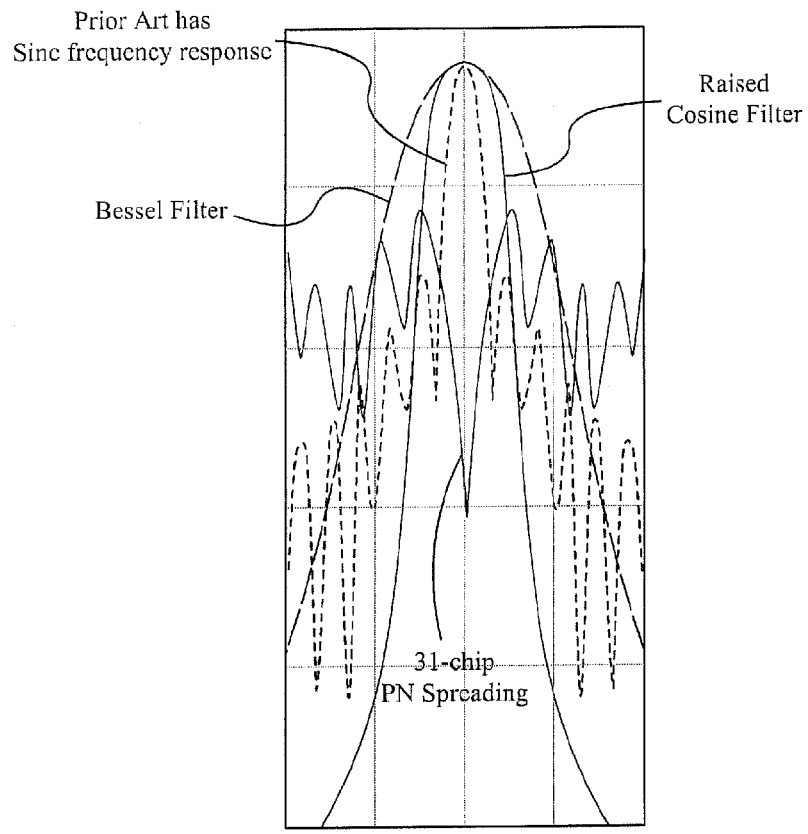
FIG. 3B is a close-up view of a portion of the graph of FIG. 3A.

FIG. 3A is a graph illustrating simulated interference rejection in relation to frequency for different interference mitigation schemes. FIG. 3B is a close-up view of an in-band portion of the graph of FIG. 3A. As seen in FIG. 3B, the in-band rejection when using the PN spreading of the present invention is very good compared with the prior art, which does not use a PN sequence and which has a Sinc frequency response. In some embodiments, the spreading can be turned on to check improvement in interference rejection or when strong interference falls in-band.

The out-of-band rejection using PN spreading is not as good since the out-of-band interference is spread into the in-band spectrum. Therefore, in some embodiments, the present invention uses low-pass channel filtering, preferably digital, immediately after down conversion to base band in order to reject out-of-band signals. In some embodiments, the present invention uses a digital low pass channel filter immediately after down conversion, but before despreading with the Barker code. The filter bandwidth would be equal to the half the subchip rate (i.e., 100/2~50 kHz). This filter is preferably designed to have zero ISI for the chip rate. In some embodiments, the output of this filter will be despread by the PN sequence (e.g., a Barker code), and then either low pass filtered (by a zero ISI filter for the chip rate, i.e., 100/31~3.2 kHz) or integrated-and-dumped.

In some embodiments, the A/D is moved to the down converter input or output, instead of at the integrate-and-dump output so that operations can be performed digitally to save chip die area of down converter, filters and integrate-and-dump units.

The prior art with integrate-and-dump has a signal bandwidth of 1/chip-rate, which in case of a 100 kHz carrier with 32 subchip/cycle would imply a 2×100/32~6 kHz RF signal bandwidth around the carrier. In some embodiments, a low-pass filter is used with 3 kHz bandwidth at the down-converter output. It is not enough to simply use any type of filter. When the signal is sampled, the filter should have settled to a very accurate amount because of the goal of detecting a small change in the analog signal. Therefore, when these signals come from the panel and go through the filter, they are preferably settled before the filter output is sample. In a preferred embodiment, the filter is designed to have zero ISI at the chip sampling intervals (with appropriate delay settings). Preferably, the ISI is much less than 1% of the change in analog signal levels to be detected. In some embodiments, the zero-ISI filter implementation of the present invention results in −50 to −60cBc filter settling at sampling instances for chip pulse input.

One example of a preferable low pass filter is a Raised Cosine filter with pulse equalization. In some embodiments, this filter replaces the integrate-and-dump operation, and only one sample per chip is taken from the filter output. The outof-band rejection of this filter depends on the tap length (delay) and the fixed-point word length of the tap coefficients. In some embodiments, out-of-band signals beyond +−3 kHz (chip rate) offset from the carrier can be rejected to the desired amount by an appropriate filter. Another example of a preferable low pass filter is a Bessel filter. In some embodiments, low pass Bessel filters are used for down converter output and/or also at the despread output, so that there is significant duration of "flat top" during a chip or subchip pulse output that is longer than the delays across the touch panel. Sampling the output at the end of flat top region ensures that the pulses from all the rows in a column have stabilized to steady state before it can be sampled. Otherwise, unsettled pulses from some rows will be sampled at the wrong time point where ISI would exist. Bessel filters have the fastest settling time to a pulse input for a given order and bandwidth. Other filters can also be used, but are preferably used with larger bandwidths to enable sufficiently fast decaying of ringing from pulse inputs from all rows in a column before the sampling instance occurrence. All low pass filters can be transformed to band pass if the operations are carried out prior to the down conversion.

Interference rejection of a $5^{th}$ order Bessel filter and small tap length Raised Cosine filter are shown in FIGS. 3A-B. A Bessel filter is preferred, as it has fast settling of the signal, thereby avoiding the requirement of having to precisely pick the sampling point. In some embodiments, the low pass filters of the present invention, such as the Bessel filter or the Raised Cosine filter, are implemented in the digital domain as opposed to in the analog domain.

In accordance with the principles of the present invention, a preferred excitation matrix has a low, non-zero condition number and the output produced at each column sense line using the excitation matrix is constant across all sense lines so that the required dynamic range of amplifiers at the sense lines can be minimized. The present invention preferably uses an orthogonal matrix as the excitation matrix. However, it is contemplated that a non-orthogonal matrix can alternatively be used as the excitation matrix. A key property of an orthogonal matrix is that any two rows are 100% orthogonal, independent of their relative phase shifts. Relative phase shift refers to the circular shift of rows relative to each other. For an orthogonal matrix, the cross correlation of any two rows is zero, independent of their relative circular shift, even for non-integer relative circular shifts. Additionally, the condition number for an orthogonal matrix is equal to one. As a result of these properties, an orthogonal matrix produces a good S/N for large panels.

One type of orthogonal matrix that is particularly useful is a Hadamard matrix. The Hadamard excitation matrix comprises only 1-bit elements of either 1 or −1. The inverse of the Hadamard matrix is the same as the original Hadamard matrix, comprising only 1-bit elements of either 1 or −1, which is in contrast to the excitation matrices of non-orthogonal matrices, whose inverse matrices have a 16-bit dynamic range requirement. In some embodiments, an orthogonal excitation matrix, preferably a Hadamard matrix, is used for panel encoding and decoding in combination with PN spreading and/or the filtering previously discussed.

Typically, the rows R in a touch screen panel varies from 10 to 60. In some embodiments, the present invention uses a Hadamard matrix whose dimension N is just larger than the number of rows R. These Hadamard dimensions are: 12, 16, 20, 24, 32, 40, 48, and 64. Any R out of N rows from the Hadamard matrix can be selected and used for the excitation matrix. For example, for a touch screen panel having 18 rows, 18 rows from a 20×20 Hadamard matrix can be used, with 2 rows of the 20×20 Hadamard matrix being discarded. In some embodiments, the column size of the Hadamard matrix is N, which is slightly larger than the row size R, and therefore different from an R×R matrix based solution.

In some embodiments, the excitation matrix is a modified Hadamard matrix that is the dot product of a Hadamard matrix with a cover code matrix. In some embodiments, the cover code matrix is produced by repeating a particular Nx1 column vector (comprised of +1's and −1's), where the Hadamard matrix and the cover code matrix are of dimension N×N. The reason for duplicating all the columns in the cover code matrix is to ensure that when a dot product is taken with the corresponding Hadamard matrix, the resultant excitation matrix is fully orthogonal with a condition number equal to 1. Below is one embodiment of an algorithm for Hadamard-based touch decoding, including the use of a cover code and offset cancellation, and shows how to search for the optimum cover code matrix for a given value of N:

```
    clear all;cic;
    N=16;
    h=hadamard(N);
    covercode=zeros(N);
    sum_max=1e6;
    for ii=1:2^N−1,
    c=dec2bin(ii,N)';
    x(c=='1')=1;
    x(c=='0')=−1;
    xx=repmat(x',1,N);
    xh=xx.*h;
    maxval=max(abs(sum(xh)));
    if maxval<sum_max && maxval>0,
        sum_max=maxval;
        covercode=xx;
    end;
    end;
    covercode
    Exct=covercode.*h;
    sum_cc=sum(covercode.*h)
    inverse_mat=inv(covercode.*h);
    scale=max(max((inv(covercode.*h))))
    inverse_mat/scale
    cond(inverse_mat)
    %% Decoding without Offset Cancellation
    if false,
    [F1,F2]=meshgrid(1:N,1:N);
    F=ones(N)+(F1+F2−1)*0.001% this is sloped panel pro-
        file F
    L=zeros(N);
    for ii=1:N,
        L(ii,:)=sum(F.*repmat(Exct(:,ii),1,N)); % received A/D
            signal end;
    Finger_BL=inv(Excti)*L
    end
    %% Decoding with Offset Cancellation
    if true
    [F1,F2]=meshgrid(1:N,1:N);
    F=ones(N)+(F1+F2−1)*0.001% this is sloped panel pro-
        file F
    L=zeros(N);
    for ii=1:N,
        L(ii,:)=sum(F.*repmat(Exct(:,ii),1,N)); % propagate
            Excitation signal over full panel at a given chip inter-
            val ii
    % L(ii,:)=L(ii,:)−sum(L(ii,1)); % offset cancellation includ-
    ing panel variation compensation
```

L(ii,:)=L(ii,:)−sum(repmat(Exct(:,ii),1,N)); % offset cancellation without compensating panel variation
   end;
   L
   offset_matrix=−repmat(sum_cc,N,1)'
   % L=L+offset_matrix; % already performed above at each chip interval
   Finger_BL=inv(Exct')*L
   end As can be seen below from the sum of each column of an original 16×16 Hadamard matrix, a particular column has a maximum absolute value of 16. After multiplying the Hadamard matrix with the cover code matrix, the maximum absolute value is reduced to 4. Using a complex cover code matrix can reduce the maximum absolute value even further. The condition number is not affected by the cover code and is maintained at 1.

Hadamard Matrix:
1 1 1 1 1 1 1 1 1 1 1 1 1 1 1 1 −1 1 −1 1 −1 1 −1 1 −1 1 −1 1 −1 1 −1 1 −1
1 −1 1 −1 1 1 −1 −1 1 1 −1 −1 1 1 −1 −1 1 1 −1 −1 1 1 −1 −1 1 1 −1 −1 1 1 −1 −1
−1 1 1 −1 −1 1 1 −1 −1 1 1 −1 −1 1 1 1 1 −1 −1 −1 −1
1 1 1 1 −1 −1 −1 −1 1 1 −1 −1 1 1 −1 −1 1 1 −1 −1 1 1
−1 1 1 1 1 −1 −1 −1 −1 1 1 1 1 −1 −1 −1 −1 1 1 1 −1 −1 1 1
−1 1 1 1 −1 1 −1 −1 1 −1 1 1 −1 1 1 1 1 1 1 1 1 1 1 1 1 1
1 1 1 −1 1 −1 1 −1 1 −1 1 −1 1 −1 1 1 1 1 −1 1 −1 1 −1 1 1
1 −1 −1 −1 −1 1 1 1 −1 1 1 1 1 −1 −1 1 1 1 −1 −1 1 1 1
−1 −1 1 1 1 −1 1 1 1 1 1 1 1 1 1 1 1 1 1 1 −1 1 1 −1 −1 1
1 −1 1 −1 1 −1 1 1 −1 1 −1 1 1 −1 −1 −1 −1 1 1 1 −1 1 1
1 1 1 −1 −1 1 −1 −1 1 −1 1 1 1 −1 −1 1 1 1 −1 −1 1 1

Optimum Cover Code Matrix:
−1 −1 −1 −1 −1 −1 −1 −1 −1 −1 −1 −1 −1 −1 −1 −1
−1 −1 −1 −1 −1 −1 −1 −1 −1 −1 −1 −1 −1 −1 −1 −1
−1 −1 −1 −1 −1 −1 −1 −1 −1 −1 −1 −1 −1 −1 −1 −1
−1 −1 −1 −1 −1 −1 −1 −1 −1 −1 −1 −1 −1 −1 −1 −1
−1 −1 −1 −1 −1 −1 −1 −1 −1 −1 −1 −1 −1 −1 −1 −1
−1 −1 −1 −1 −1 −1 1 1 1 1 1 1 1 1 1 1 1 1 1 1 1 1
1 1 1 1 1 1 1 1 1 1 1 −1 −1 −1 −1 −1 −1 −1 −1 −1 −1
−1 −1 −1 −1 −1 1 1 1 1 1 1 1 1 1 1 1 1 1 1 1 −1 −1 −1
−1 −1 −1 −1 −1 −1 −1 −1 −1 −1 −1 −1 −1 1 1 1 1 1 1 1 1
1 1 1 1 1 1 1 1 −1 −1 −1 −1 −1 −1 −1 −1 −1 −1 −1 −1
−1 −1 −1 1 1 1 1 1 1 1 1 1 1 1 1 1 1 1 1 1 1 1 1 1
1 1 1 1 1 1 1 −1 −1 −1 −1 −1 −1 −1 −1 −1 −1 −1 −1 −1
−1 −1

In some embodiments, when all N rows are not used in a touch panel, the search for the cover code is done by looking for the minimum(absolute(sum of column)) over the non-zero rows. The entries for the unused rows is "+1" in the cover code for the inverse matrix computation.

Figure 2:
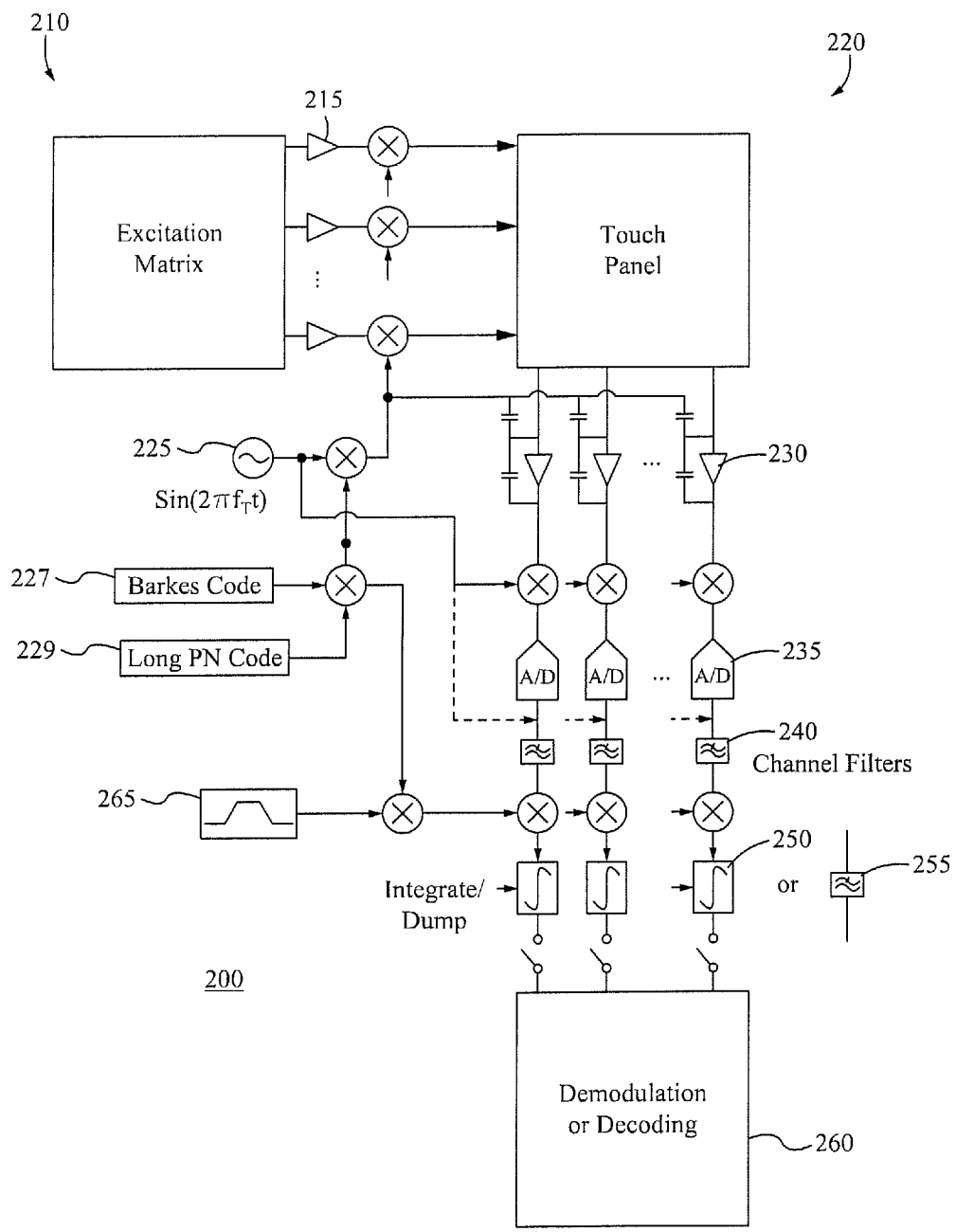
FIG. 2 illustrates one embodiment of a touch screen system in accordance with some embodiments of the present invention.

FIG. 2 illustrates one embodiment of a touch screen system 200 in accordance with some embodiments of the present invention. In touch screen system 200, excitation matrix E, 210, excites the rows of mutual capacitance touch panel matrix F, 220. In some embodiments, excitation matrix E is a non-orthogonal matrix. In some embodiments, excitation matrix E is an orthogonal matrix. Preferably, excitation matrix E comprises a modified Hadamard matrix. In some embodiments, the excitation matrix 210 comprises an N×N modified Hadamard matrix. In some embodiments, the excitation matrix comprises an orthogonal matrix other than a Hadamard matrix, such as a Walsh matrix. In some embodiments, this orthogonal matrix other than a Hadamard matrix is dot multiplied with a cover code to form a modified orthogonal matrix, similar to how the modified Hadamard matrix is produced.

In some embodiments, excitation matrix E is represented by the equation: E=H.*Cc (dot multiplication of matrices), where H is an N×N Hadamard matrix, and Cc is an N×N cover code matrix with elements of either 1 or −1 and chosen so that maximum(absolute(column_sum($E_{partial}$))) is at a minimum. $E_{partial}$ is a truncated excitation matrix. It comprises R arbitrary rows of excitation matrix E that will be used to drive the physical panel row ITOs. In a particular embodiment, the columns of Cc are identical, i.e., the same N×1 column code of Cc is used to multiply the excitation matrix row-drive N×1 vector each chip. The panel F is assumed to be of dimension N rows×N columns for the signal processing, even though the physical panel is R rows×C columns, with R and C being less than or equal to N. F is zero for rows greater than R and for columns greater than C. In some embodiments, the cover code matrix implements Binary Phase-Shift Keying (BPSK) modulation on the carrier signal. In some embodiments, the cover code matrix is not used and the excitation matrix E is represented by the equation: E=H.

In some embodiments, the use of the cover code involves phase shifting the sine-wave carrier each chip, by 0, 90, 180 and 270 degrees. Therefore, the Cc elements are +−1+−j. The inverse of the excitation matrix E=H.*Cc therefore will also be complex, and also +−1+−j after integer scaling. The advantage of QPSK modulation is that the peak magnitude of column_sum(E) can be further reduced compared to BPSK cover code.

In one example, touch panel 220 has 18 drive channels and 16 sense columns Preferably, the order, N, of the excitation matrix 210 is greater than or equal to the larger of the number of drive channels (here, 18), and the number of sense columns (here, 16). In some embodiments, the Hadamard matrix has order 1, 2, or 4 k where k is an integer greater than zero. In this example, the lowest order, N, for a Hadamard excitation matrix 210 meeting the foregoing criteria is N=20. For each column, $C_i$, of the Hadamard excitation matrix 210, the column is selected, each drive signal is fed to an amplifier 215, and the amplified selected column is preferably multiplied by a short PN code 227, such as a Barker code, and mixed with a sine wave 225 (e.g., a 100 KHz sine) to produce a drive signal for each of the drive channels of the touch panel 220. In some embodiments, a long PN code 229 is also used to produce the drive signals. In some embodiments, each drive signal is filtered by a filter before feeding the drive signal to a drive channel of the touch panel 220.

Although not shown, in some embodiments as discussed above, a cover code is also multiplied with the signals from the excitation matrix to produce the drive signals for the touch panel 220. In some embodiments, the cover code is a vector of order N. The coefficients of the cover code vector are able to be 1-bit values, integers, real values, or complex values. In some embodiments, the cover code is dot multiplied with the Hadamard matrix to form a modified Hadamard matrix as the excitation matrix. In some embodiments, the cover code, multiplied by the sine wave 225, is also fed to the each column sense channel to demodulate the channel at a sense channel amplifier 230.

In some embodiments, an R×R subset of H, denoted by Hs, is used. The $1^{st}$ row and column of H are not used in Hs. By doing a simple R×R matrix search over (N−1)×(N−1) version of H for low condition number, low column-sum and low RMS error, very good solutions are obtained for the general matrix-based method that always uses R×R excitation and inverse matrices. The key advantage of this method is that the inverse matrix coefficients are just 1-3 bits. The disclosed embodiments of time varying real or complex cover code and time-varying cyclical DC cancellation are applicable here, although a cover code can be redundant in this case.

For the example touch panel 220, there are 18 drive channels and the excitation matrix 210 has order 20. Thus, each selected column of the excitation matrix 210 has 20 coefficients. The last two coefficients of a selected column of the excitation matrix 210 are not transmitted to the touch panel 220 because there is no corresponding drive channel (e.g. 19 and 20) on the touch panel 220. Conceptually, the physical touch panel 220 exists within an N×N matrix having null values for rows greater than the touch panel 220 (here, rows 19 and 20) and null values for columns greater than the touch panel 220 (here, columns 17 through 20). Each column sense is preferably input to an amplifier 230, mixed with the sine wave 225, then converted to the digital domain using A/Ds 235. In some embodiments, the sine wave 225 is applied prior to ADs 235, while in other embodiments, the sine wave 225 is applied after ADs 235. Preferably, the resulting digital values are fed to channel filters 240, such as the low pass filters discussed above (e.g., Bessel and Raised Cosine). In some embodiments, the PN code 227, as well as the long PN code 229 if applicable, are applied to the resulting values downstream from the filters 240. In some embodiments, a window function 265 is applied to the resulting values as well. In some embodiments, Hamming windowing or Bartlett windowing is used. However, it is contemplated that other windowing functions are within the scope of the present invention. In some embodiments, resulting digital values are fed to an integrate-and-dump operation 250. In some embodiments, the integrate-and-dump operation is replaced with a low pass filter 255, such as one of the low pass filters discussed above (e.g., Bessel and Raised Cosine).

In some embodiments, the resulting digital values are then fed to a demodulation or decoding unit 260. In some embodiments, the resulting digital values are stored in a matrix of voltages. In some embodiments, a fixed delay is added to each sense line to reduce phase shift in the drive signal propagation to the sense line. The fixed delay is able to be different for each sense line. The matrix of voltages has null values for the coefficients of row numbers greater than the touch panel 220 (here, rows 19 and 20) and null values for the coefficients of column numbers greater than the touch panel 220 (here, columns 17 through 20). The matrix of voltages is multiplied by the inverse matrix of the excitation matrix to obtain a matrix of panel capacitance values at each drive channel and column sense intersection. When no touch is detected upon the panel 220, the coefficients of the capacitance matrix are averaged to filter out anomalies, then the averaged coefficients are used by a summation/difference element to determine a final matrix of capacitances in an N×N matrix. Alternatively, or in addition, to using averaging, a baseline phase-compensated matrix of capacitances (not shown) representing no touch upon the touch panel 220 is able to be used to determine when no touch is upon the touch panel 220. In addition, averaging can be combined with the baseline phase-compensated matrix of capacitances (not shown) to further reduce error phase shift error in the matrix of capacitance values. The baseline phase compensated matrix (not shown) is able to be established as a function of the model of the touch panel, as a part of a power-up sequence of a device incorporating the touch panel and decoder circuit, or as a part of a factory test sequence. Coefficients of the N×N matrix corresponding to rows that are greater than the number of rows in the touch panel 220 have null values. Coefficients of the N×N matrix corresponding to columns that are greater than the number of columns in the touch panel have null values.

In some embodiments, the DC cancellation circuit at the receiver (e.g., as seen in FIG. 1) is removed, thereby simplifying the architecture and reducing the silicon die area significantly. In some embodiments, the DC cancellation at the receiver is changed with a cyclical cancellation sequence.

Some embodiments of the equations for the touch screen processing of the present invention are described below. As discussed above, the present invention improves upon the prior art with the usage of PN spreading and digital filtering. S(t) is now given by:

$$S(t)=P(t)*\sin(2\pi f_T t), \text{ where } P(t) \text{ is a PN spreading sequence.}$$

The property of P(t) is:

$$\int_{t=0}^{t=T_{chip}} P(t).\text{conj}[P(t)]\,dt = 1$$

In some embodiments, the PN sequence is dot-multiplied with a cover code and used with a Hadamard excitation matrix.

Preferably, each column of mutual capacitance panel F is dot-multiplied with one selected column of excitation matrix E. In some embodiments, this is achieved by the row amplifiers driving the row ITOs. The process is repeated sequentially every chip interval $T_k$ for each column of the excitation matrix. The successive chip time intervals are labeled by k=1 to N, where N is equal to the dimension of the Hadamard matrix that is just bigger than R, the number of rows. The modulation involves multiplying the row data with a sine-wave signal. Preferably, there are an integer number of sine wave cycles per $T_{chip}$. Each column output of the panel is the sum of the row signals affecting the particular column. The $c^{th}$ column signal at the $k^{th}$ chip interval is given by Equation 6 below. Multiplication of excitation matrix E by the carrier sine wave is omitted from this discussion for simplification. The range of c is 1 to N, and if C is less than N, then the panel F is taken as zero for F(:,c), c>C. Similarly, if R is less than N, the panel F is taken as zero for F(r,:), r>R.

$$L(k,c)=F(1,c)*E(1,k)+F(2,c)*E(2,k)+F(3,c)*E(3,k)+\ldots+F(N,c)*E(N,k) \quad \text{[Eq. 6]}$$

L(k,c)=ΣF(r,c)*E(r,k), summed over r=1 to N
L(k,c)=ΣE(k,r)*F(r,i), summed over r=1 to N
Using general matrix multiplication notation Y=A*B where element Y(i,j)=Σ[A(i,n)*B(n,j)], n=1 to X, $$L=E'*F, \quad \text{[Eq. 7]}$$

where L=L(k,c) is the received column matrix,
E=E(r,k) is the transmitted Excitation matrix, and
F=F(r,c) is the panel mutual capacitance matrix.
The final column signal L is actually obtained by demodulating (multiplying) with the carrier sine wave followed by an integrate-and-dump operation. In order to obtain the panel mutual capacitance matrix F, from Equation 7, $$F=\text{inv}(E')*L. \quad \text{[Eq. 8]}$$

The variation in F(r,c) is only 1-5%, so Equation 6 is approximately the column-sum of E for the $c^{th}$ column. Even though E doesn't have a constant column-sum, the dynamic range of the A/D (e.g., after the integrate-and-dump in the prior art, or before the integrate-and-dump as an embodiment of the present invention) can be improved by having the column-sum equal to zero. This is done by subtracting a time varying repeated sequence d(k,l) from the column signal:

$$L2(k,c)=L(k,c)-\text{horzcat}[d(k,l)\text{`N' times}]=E'*F-d(k,c),$$

$$L2(k,c)=L(k,c)-d(k,c)=E'*F-d(k,c), \quad \text{[Eq. 9]}$$

where d(k,l)=−sum(E(:,k))
and d(k,c)=horzcat[d(k,l), d(k,l), d(k,l), … d(k,l)] done 'N' times.

From above, $$F=\text{inv}(E')*L2-d(k,c)*\text{inv}(E')$$

$F=\text{inv}(E')*L2-D(k,c)$, where $D(k,c)=d(k,c)*\text{inv}(E')$ is a constant N×N matrix.

The value of D is not computed directly, since it cancels out in the baseline correction for computing the finger image profile Fp (given below for the $f^{th}$ frame):

$$Fp=F-B \text{ where } B=\text{mean}(F \text{ without finger})$$

$$Fp=(\text{inv}(E')*L2-D)-\text{mean}[\text{inv}(E')*L2(\text{without finger})-D]$$

$$Fp=\text{inv}(E')*L2-\text{mean}[\text{inv}(E')*L2(\text{without finger})]. \quad [\text{Eq. 10}]$$

As seen in Equation 10, the finger profile is extracted without actually computing the value of D.

It is noted that the positioning of the A/D after the integrate-and-dump operation, before the integrate-and-dump operation, as part of the LNA, or before the LNA, and the usage of digital and/or analog filters in the receiver signal chain to mitigate against interference can be employed within the present invention. Referring back to FIG. 2, as a result of the digitization at the output of the amplifiers 230, signal processing can be performed in the receiver's digital domain. Signal processing can include any implementation of the processing performed downstream of amplifiers 130 in FIG. 1. Positioning the A/Ds directly to the amplifier outputs is especially useful in enabling phase adjustment, such as delays, to be configured digitally as opposed to using analog configurations of delays, which are expensive.

Figure 4A:
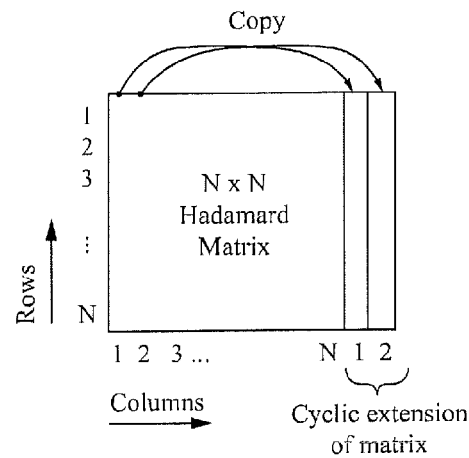
FIG. 4A illustrates one embodiment of an excitation matrix with a cyclic extension in accordance with some embodiments of the present invention.

In order to maintain a relative circular shift between rows when viewed in the linear time domain, the present invention can employ a circularly appending of a beginning part of each row to its end. FIG. 4A illustrates one embodiment of an excitation matrix, such as an N×N Hadamard matrix or modified Hadamard matrix, with a cyclic extension in accordance with the principles of the present invention. The number of row elements appended should be larger than the equivalent maximum time shift Td over the panel. Therefore, no matter how much phase shift occurs over the column, there is no ISI at a given pixel from any other pixel. In FIG. 4A, the first two row elements are appended to the end of the row for each row. These two appended row elements are a cyclic extension of the matrix. Preferably, the sampled frame for decoding should skip the first Td section from the start of the row excitation burst, so that full circular shifted rows are captured.

Figures 4B, 5A:
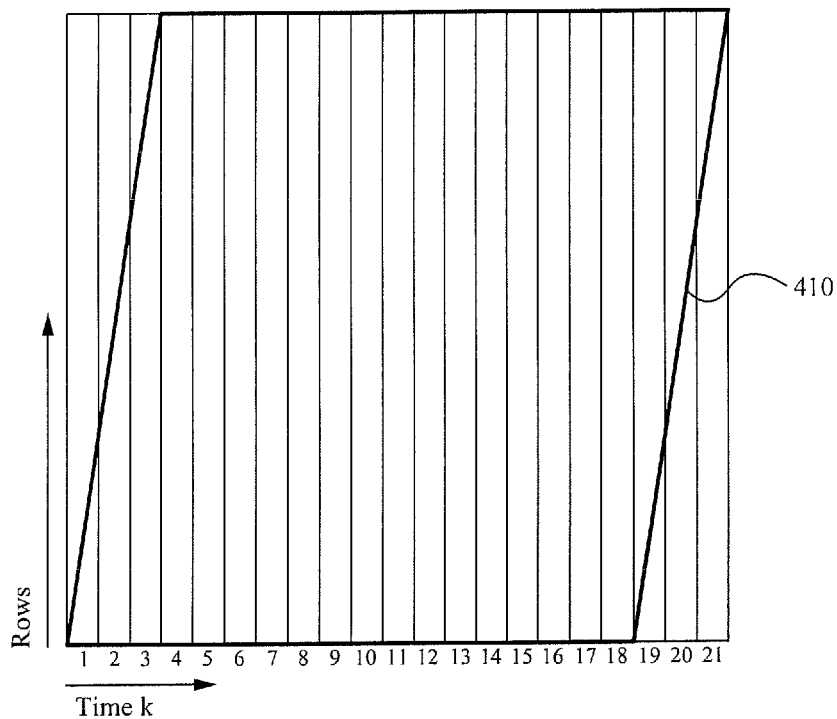
FIG. 4B illustrates one example of how the cyclic extension mitigates phase shift during a scan of a touch panel.
FIG. 5A illustrates a clustering technique for a touch screen system in accordance with some embodiments of the present invention.

FIG. 4B illustrates one example of how the cyclic extension mitigates phase shift during a scan of a touch panel. In this example, there is a delay of 3 bits. A rectangular excitation matrix is being used. However, the diagonal area 410 is actually what is being sensed at the column output. The delay causes there to be a difference between the excitation matrix being used and what is actually being sensed. In order to compensate for the delay of 3 bits, the first 3 columns of the excitation matrix are appended to the end of it. As seen in FIG. 4B, the excitation matrix has 21 columns (the original 18, plus the additional 3 that have been appended). Without the addition of the first 3 columns to the end of the excitation matrix in the form of columns 19, 20, and 21, the column output would be incomplete. Circularly appending columns to the end of the matrix compensates for this effect of the delay. The column outputs are the sums of the rows, but the rows are relatively shifted in time. Hadamard matrices and modified Hadamard matrices are especially useful here, as they can still be decoded orthogonally under these circumstances. With Hadamard matrices and modified Hadamard matrices, any two rows are orthogonal with any amount of circular shift.

The prior art cannot employ the cyclical extension used in the present invention because the prior art does not employ Hadamard matrices or modified Hadamard matrices. As a result, the moment that there is a relative shift of one row to another row, it messes up the decoding completely.

Preferably, a delay is used along with the cyclical extension. Using the example above, you would wait for 3 bits, then start sensing the output of each column. It takes 3 bits for the signal to reach the end of the panel. In this example, you are still processing the same 18 columns. However, you are copying 3 columns and are processing those in order to have a full matrix.

In the prior art, delays are placed in the transmittal for each row. However, this solution is expensive and it requires the generation and storing of the delays, which involves a lot of pre-processing. However, using the Hadamard matrix or modified Hadamard matrix according to the present invention allows you to simply add bits at the end of the rows, as opposed to the prior art's requirement of very precise adjustment of delays.

One particularly beneficial feature of the present invention is the digitization at the output of the low noise amplifier for each column. In some embodiments, a dedicated A/D is used for each column. In some embodiments, full or partial multiplexing of column signals is employed, using fewer A/Ds. As a result of the digitization at the output of the amplifiers, signal processing can be performed in the receiver's digital domain. Positioning the A/Ds directly to the amplifier outputs is especially useful in enabling phase adjustment, such as delays, to be configured digitally as opposed to using analog configurations of delays, which are expensive. Accurate phase adjustments do not create ICI due to cyclically shifted orthogonal codes. It only reduces the amplitude slightly, which only affects the S/N marginally.

The present invention provides a means to eliminate the gain reduction of the down converter when the rows and columns suffer significant phase shift. The digitization discussed above is particularly useful in employing region-specific delays. Each pixel can be demodulated independently by using its own code to despread the output of the column, but you have to have the appropriate delay in the dispreading signal to match the delay of the panel. However, you do not need a delay for each pixel. Instead, you can have a delay for clusters, thereby simplifying the signal processing.

Although the digital implementation of the correlator and integrator discussed above is beneficial, it is contemplated that the present invention can also employ analog implementation of the correlator and integrator.

FIG. 5A illustrates a clustering technique for a touch screen system in accordance with some embodiments of the present invention. The panel area is divided into 2-dimensional clusters that have negligible phase shifts over each cluster. The panel in FIG. 5A has 6 cluster regions (labeled #'s 1 through 6). Each cluster region has a corresponding delay. So, to decode pixels in cluster region 1, the corresponding delay of cluster region 1 is used. To decode pixels in cluster region 2, the corresponding delay of cluster region 2 is used. And so on. Referring back to the cyclical extension previously discussed, the Hadamard excitation matrix or modified Hadamard excitation matrix is preferably extended by an amount larger than the maximum panel delay $\Delta t_i$, where $\Delta t_i = \Delta \theta_i / 2\pi f_T$, i=cluster number, $f_T$=carrier frequency, and $\Delta \theta_i$=mean cluster signal phase shift relative to carrier.

In some embodiments, the down conversion is done digitally and separately for each cluster with a corresponding fixed phase offset of the local oscillator. The signal is preferably digitized prior to the down conversion. The integrate-and-dump can also be employed digitally with corresponding timing for each cluster.

Figure 5B:
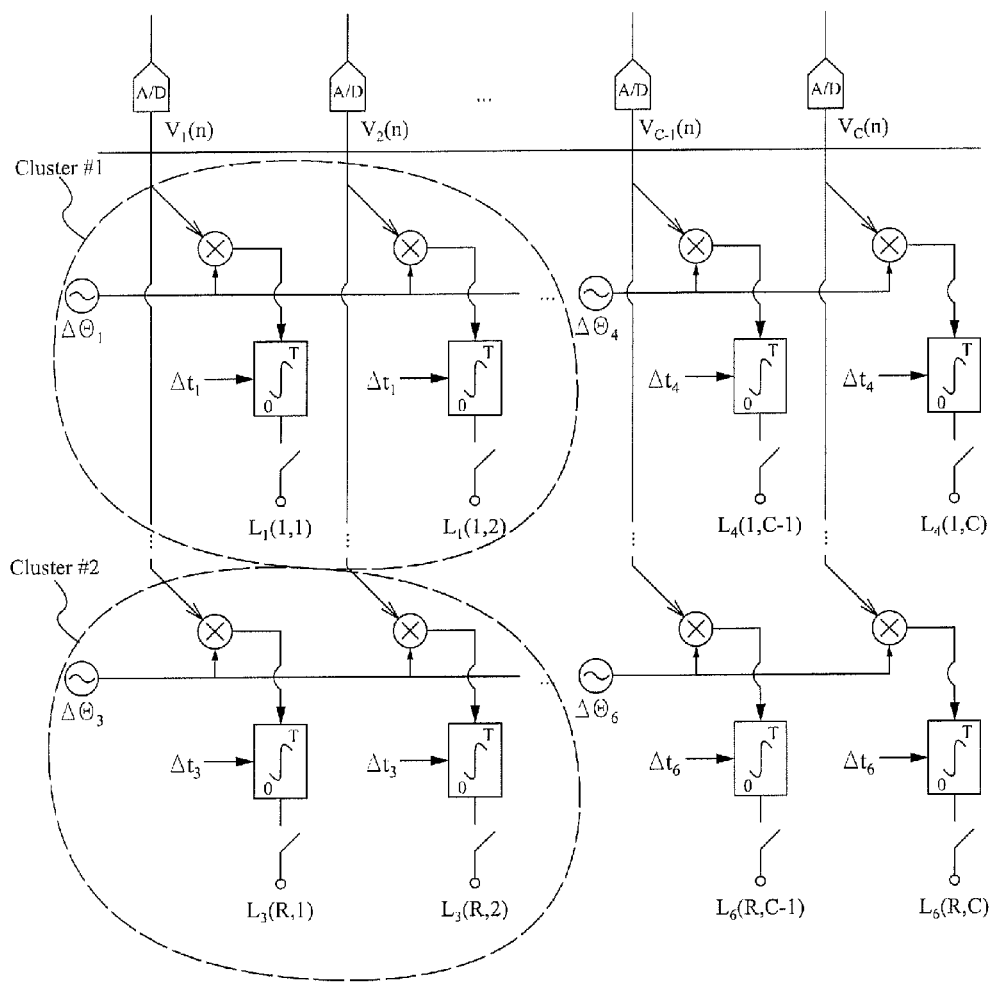
FIG. 5B is a schematic diagram illustrating one embodiment of an implementation of the clustering technique in accordance with some embodiments of the present invention.

FIG. 5B is a schematic diagram illustrating one embodiment of an implementation of the clustering technique in accordance with some embodiments of the present invention. Each cluster is a region of selected rows and columns, and each cluster is decorrelated with a region-specific phase shift of a local oscillator. In some embodiments, this decorrelation is followed by a regular integrate-and-dump operation with a suitably aligned clock (or data block) that is specific to that region. In some embodiments, the L matrix (or the L2 matrix) is recomposed using clustered matrices $L_1, L_2, \ldots L$. In some embodiments, each clustered sub-matrix $L_i$ is processed with a sub-inverse-matrix for decoding.

Using a Hadamard excitation matrix or a modified Hadamard excitation matrix, the output at the sense channels is not substantially constant across all sense channels in certain situations when no touch is present upon the touch panel. The previously mentioned cover code, which is a constant vector, can be used to bring the column sense channel outputs to a substantially constant voltage. Then, the constant voltage is able to be used as an offset to bring all sense channel voltages to substantially zero when no touch is present upon the touch panel. Thus, the dynamic range required for LNAs at the sense channels, and associated A/Ds receiving the output of the LNAs, can be reduced over the prior art. Using the present invention, a touch panel controller can be made that is smaller, uses less power, generates less heat, and has a lower cost over the prior art.

In some embodiments, the coefficients of the cover code are one of −1, +1, and 0 such that the cover code can be encoded as a single binary value. In some embodiments, the coefficients of the cover code are real-valued, complex-valued, or a combination thereof. In some embodiments, the cover code is a vector of M coefficients for a touch panel having M drive channels. The coefficients of the cover code are preferably chosen such that the output voltages, V, received at the sense channels of the touch panel are all substantially the same when there is no touch upon the touch panel. In some embodiments, an offsetting corrective voltage, −V, is then injected at all sense channels so that the sense channels all report a voltage that is substantially zero when there is no touch upon the touch panel. This property of the cover code enables the use of LNAs at the sense channels that have smaller dynamic range over the prior art. The benefit of LNAs with a smaller dynamic range is that the LNAs of the present invention can be lower cost, smaller, use less power, generate less heat, and require fewer bits in an associated A/D over the prior art.

In some embodiments, the present invention comprises time-varying DC cancellation to make the row-sum equal zero. In some embodiments, the present invention comprises injecting an offset voltage to the output of each sense channel such that the voltage output at all sense channels is substantially the same when no touch is made upon the touch panel. In some embodiments, injecting an offset voltage to the output of each sense channel comprises injecting a voltage that varies with the selection of the $i^{th}$ excitation matrix column $C_i$. In some embodiments, injecting an offset voltage comprises injecting the offset voltage at a point after a sense channel amplifier and before a sense channel integrator. In some embodiments, injecting an offset voltage comprises injecting a constant voltage for all sense channels. In some embodiments, the present invention employs offset cancellation via suitable DC injection at the integrator input that is connected to the correlator output in the receiver. This injection point is a more suitable place for offset cancellation since the integrator is more prone to signal overload compared to the sense amplifier. In some embodiments, the offset cancellation code is individualized for each sensor, i.e., tweaked for each particular sensor for complete cancellation. In some embodiments, the offset cancellation code is individualized for mean response of panel variation.

It is contemplated that the present invention can incorporate features from U.S. Patent Application Publication Number 2010/0060593 to Krah, filed Sep. 10, 2008, and entitled "Phase Compensation for Multi-Stimulus Controller," the contents of which are hereby incorporated by reference in their entirety as if set forth herein. For example, in some embodiments, the present invention employs a sine wave lookup table for the row-drive waveform, as disclosed in Krah, instead of using memory to save the waveform, in order to save memory and chip area. Additionally, Krah describes how to mitigate panel phase shifts by modifying the inverse matrix appropriately in the decoding process. In some embodiments, the present invention incorporates this modified inverse matrix decoding method. As discussed above with respect to FIGS. 5A-B, in some embodiments of the present invention, the panel is broken down into clusters. In some embodiments, a modified inverse matrix is used for each cluster. However, it is noted that the present invention's previously discussed application of appropriate delays per row-drive to compensate for panel delays, such as discussed with respect to FIGS. 5A-B, is better for S/N compared to the modified inverse matrix method. With the modified inverse matrix method, the S/N will degrade by an amount of panel gain reduction equal to $1/\cos\theta$, where $\theta$ is the correlator phase alignment for a given pixel and is the uncorrected phase when going over a column ITO.

The following co-pending patent applications describe features related to the present application and are hereby incorporated by reference in their entirety as if set forth herein: "HADAMARD MATRIX BASED PROJECTED MUTUAL CAPACITANCE TOUCH PANEL DECODING," by Rishi Mohindra, filed concurrently with the present application, being U.S. patent application Ser. No. 13/480,357, and "MUTUAL CAPACITANCE LARGE PANEL PHASE SHIFT MITIGATION," by Rishi Mohindra, filed concurrently with the present application, being U.S. patent application Ser. No. 13/480,395. It is contemplated that any of the features described within these co-pending patent applications can be incorporated into the present invention.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications can be made in the embodiment chosen for illustration without departing from the spirit and scope of the invention as defined by the claims.

What is claimed is:

1. A touch screen controller for a capacitive touch screen panel having a plurality of row conductors intersecting with a plurality of column conductors to form a matrix of pixels, each pixel configured to have a capacitance, the touch screen controller comprising:

a transmitting unit configured to drive the row conductors with row drive signals formed from an excitation matrix, the excitation matrix including a cyclic extension at the end of each row, the cyclic extension for each row repeating a sequence of elements taken in order from a beginning portion of the row, the sequence of elements including a number of elements that exceeds a maximum time shift over the capacitive touch screen panel; and a receiving unit configured to sense signals from the column conductors and to determine the capacitance of the pixels using the sensed signals, wherein the receiving unit is configured to apply at least one of low pass filtering, Raised Cosine filtering, or Bessel filtering to the sensed signals prior to the capacitance of the pixels being determined.

2. The touch screen controller of claim 1, wherein the receiving unit is configured to apply the at least one of low pass filtering, Raised Cosine filtering, or Bessel filtering digitally to the sensed signals.

3. The touch screen controller of claim 1, wherein the at least one of low pass filtering, Raised Cosine filtering, or Bessel filtering is low pass filtering.

4. The touch screen controller of claim 1, wherein the at least one of low pass filtering, Raised Cosine filtering, or Bessel filtering is Raised Cosine filtering.

5. The touch screen controller of claim 1, wherein the at least one of low pass filtering, Raised Cosine filtering, or Bessel filtering is Bessel filtering.

6. The touch screen controller of claim 1, wherein the transmitting unit is configured to pulse shape the row drive signals.

7. The touch screen controller of claim 6, wherein the transmitting unit is configured to pulse shape the row drive signals with a sine wave.

8. The touch screen controller of claim 1, wherein:
the transmitting unit is configured to spread each bit of the row drive signals with a pseudo-noise code; and
the receiving unit is configured to de-spread the sensed signals with the pseudo-noise code.

9. The touch screen controller of claim 8, wherein the pseudo-noise code is a Barker code.

10. The touch screen controller of claim 8, wherein:
the transmitting unit is further configured to spread the row drive signals with a long pseudo-noise code, wherein the long pseudo-noise code covers multiple bits; and
the receiving unit is further configured to de-spread the sensed signals with the pseudo-noise code.

11. The touch screen controller of claim 8, wherein the receiving unit is configured to apply a window function to the de-spreading pseudo-noise code.

12. The touch screen controller of claim 1, wherein the excitation matrix is a modified Hadamard matrix that is the dot product of a Hadamard matrix with a cover code matrix.

13. A method of mitigating interference in a capacitive touch screen panel having a plurality of row conductors intersecting with a plurality of column conductors to form a matrix of pixels, each pixel configured to have a mutual capacitance, the method comprising:
driving the row conductors with row drive signals formed from an excitation matrix, the excitation matrix including a cyclic extension at the end of each row, the cyclic extension for each row repeating a sequence of elements taken in order from a beginning portion of the row, the sequence of elements including a number of elements that exceeds a maximum time shift over the capacitive touch screen panel;
sensing signals from the column conductors;
applying at least one of a low pass filter, a Raised Cosine filter, or a Bessel filter to the sensed signals; and
determining the capacitance of the pixels using the filtered sensed signals.

14. The method of claim 13, wherein the at least one of the low pass filter, the Raised Cosine filter, or the Bessel filter is applied digitally.

15. The method of claim 13, wherein applying the at least one of a low pass filter, a Raised Cosine filter, or a Bessel filter to the sensed signals includes applying a low pass filter to the sensed signals.

16. The method of claim 13, wherein applying the at least one of a low pass filter, a Raised Cosine filter, or a Bessel filter to the sensed signals includes applying a Raised Cosine filter to the sensed signals.

17. The method of claim 13, wherein applying the at least one of a low pass filter, a Raised Cosine filter, or a Bessel filter to the sensed signals includes applying a Bessel filter to the sensed signals.

18. The method of claim 13, further comprising pulse-shaping the row drive signals.

19. The method of claim 18, wherein pulse-shaping the row drive signals comprises pulse-shaping the row drive signals with a sine wave.

20. The method of claim 13, further comprising:
spreading each bit of the row drive signals with a pseudo-noise code; and
de-spreading the sensed signals with the pseudo-noise code.

21. The method of claim 20, wherein spreading each bit of the row drive signals with the pseudo-noise code includes spreading each bit of the row drive signals with a Barker code.

22. The method of claim 20, further comprising:
spreading the row drive signals with a long pseudo-noise code, wherein the long pseudo-noise code covers multiple bits; and
de-spreading the sensed signals with the pseudo-noise code.

23. The method of claim 20, further comprising applying a window function to the de-spreading pseudo-noise code.

24. The method of claim 13, wherein driving the row conductors with row drive signals formed from the excitation matrix includes driving the row conductors with row drive signals formed from a modified Hadamard matrix that is the dot product of a Hadamard matrix with a cover code matrix.

25. A touch screen controller for a capacitive touch screen panel having a plurality of row conductors intersecting with a plurality of column conductors to form a matrix of pixels, each pixel configured to have a capacitance, the touch screen controller comprising:
a transmitting unit configured to drive the row conductors with row drive signals formed from an excitation matrix, wherein the transmitting unit is configured to spread each bit of the row drive signals with a pseudo-noise code, the excitation matrix including a cyclic extension at the end of each row, the cyclic extension for each row repeating a sequence of elements taken in order from a beginning portion of the row, the sequence of elements including a number of elements that exceeds a maximum time shift over the capacitive touch screen panel; and
a receiving unit configured to sense signals from the column conductors and to determine the capacitance of the pixels using the sensed signals, wherein the receiving unit is configured to de-spread the sensed signals with the pseudo-noise code prior to the capacitance of the pixels being determined.

26. The touch screen controller of claim 25, wherein the pseudo-noise code is a Barker code.

27. The touch screen controller of claim 25, wherein:
the transmitting unit is further configured to spread the row drive signals with a long pseudo-noise code, wherein the long pseudo-noise code covers multiple bits; and
the receiving unit is further configured to de-spread the sensed signals with the long pseudo-noise code.

28. The touch screen controller of claim 25, wherein the receiving unit is configured to apply a window function to the de-spreading pseudo-noise code.

29. The touch screen controller of claim 25, wherein the transmitting unit is configured to pulse shape the row drive signals.

30. The touch screen controller of claim 29, wherein the transmitting unit is configured to pulse shape the row drive signals with a sine wave.

31. The touch screen controller of claim 25, wherein the receiving unit is configured to apply zero-ISI filtering to the sensed signals prior to the capacitance of the pixels being determined.

32. The touch screen controller of claim 31, wherein the receiving unit is configured to apply the zero-ISI filtering digitally to the sensed signals.

33. The touch screen controller of claim 31, wherein the zero-ISI filtering is low pass filtering.

34. The touch screen controller of claim 31, wherein the zero-ISI filtering is Raised Cosine filtering.

35. The touch screen controller of claim 31, wherein the zero-ISI filtering is Bessel filtering.

36. The touch screen controller of claim 25, wherein the excitation matrix is a modified Hadamard matrix that is the dot product of a Hadamard matrix with a cover code matrix.

37. A method of mitigating interference in a capacitive touch screen panel having a plurality of row conductors intersecting with a plurality of column conductors to form a matrix of pixels, each pixel configured to have a mutual capacitance, the method comprising:
driving the row conductors with row drive signals formed from an excitation matrix, the excitation matrix including a cyclic extension at the end of each row, the cyclic extension for each row repeating a sequence of elements taken in order from a beginning portion of the row, the sequence of elements including a number of elements that exceeds a maximum time shift over the capacitive touch screen panel, wherein each bit of the row drive signals is spread with a pseudo-noise code;
sensing signals from the column conductors;
de-spreading the sensed signals with the pseudo-noise code; and
determining the capacitance of the pixels using the de-spread sensed signals.

38. The method of claim 37, wherein de-spreading the sensed signals with the pseudo-noise code includes de-spreading the sensed signals with a Barker code.

39. The method of claim 37, further comprising:
spreading the row drive signals with a long pseudo-noise code, wherein the long pseudo-noise code covers multiple bits; and
de-spreading the sensed signals with the long pseudo-noise code.

40. The method of claim 37, further comprising applying a window function to the de-spreading pseudo-noise code.

41. The method of claim 37, further comprising pulse-shaping the row drive signals.

42. The method of claim 41, further comprising pulse-shaping the row drive signals with a sine wave.

43. The method of claim 37, further comprising applying a zero-ISI filter to the sensed signals prior to the capacitance of the pixels being determined.

44. The method of claim 43, wherein the zero-ISI filter is applied digitally.

45. The method of claim 43, wherein applying the zero-ISI filter to the sensed signals prior to the capacitance of the pixels being determined includes applying a low pass filter to the sensed signals prior to the capacitance of the pixels being determined.

46. The method of claim 43, wherein applying the zero-ISI filter to the sensed signals prior to the capacitance of the pixels being determined includes applying a Raised Cosine filter to the sensed signals prior to the capacitance of the pixels being determined.

47. The method of claim 43, wherein applying the zero-ISI filter to the sensed signals prior to the capacitance of the pixels being determined includes applying a Bessel filter to the sensed signals prior to the capacitance of the pixels being determined.

48. The method of claim 37, wherein driving the row conductors with row drive signals formed from the excitation matrix includes driving the row conductors with row drive signals formed from a modified Hadamard matrix that is the dot product of a Hadamard matrix with a cover code matrix.

49. A touch screen controller for a capacitive touch screen panel having a plurality of row conductors intersecting with a plurality of column conductors to form a matrix of pixels, each pixel configured to have a capacitance, the touch screen controller comprising:
a transmitting unit configured to drive the row conductors with row drive signals formed from an excitation matrix, the excitation matrix including a cyclic extension at the end of each row, the cyclic extension for each row repeating a sequence of elements taken in order from a beginning portion of the row, the sequence of elements including a number of elements that exceeds a maximum time shift over the capacitive touch screen panel, wherein the transmitting unit is configured to pulse shape the row drive signals; and
a receiving unit configured to sense signals from the column conductors and to determine the capacitance of the pixels using the sensed signals.

50. The touch screen controller of claim 49, wherein the transmitting unit is configured to pulse shape the row drive signals with a sine wave.

51. A method of mitigating interference in a capacitive touch screen panel having a plurality of row conductors intersecting with a plurality of column conductors to form a matrix of pixels, each pixel configured to have a mutual capacitance, the method comprising:
driving the row conductors with row drive signals formed from an excitation matrix, the excitation matrix including a cyclic extension at the end of each row, the cyclic extension for each row repeating a sequence of elements taken in order from a beginning portion of the row, the sequence of elements including a number of elements that exceeds a maximum time shift over the capacitive touch screen panel, wherein the row drive signals are pulse-shaped;
sensing signals from the column conductors; and
determining the capacitance of the pixels using the sensed signals.

52. The method of claim 51, wherein the row drive signals are pulse-shaped with a sine wave.

* * * * *